Aug. 22, 1967 L. W. RAMSEY 3,336,736
PLANT COMPRESSING AND GUIDING SYSTEM FOR
MECHANICAL COTTON PICKERS
Filed April 13, 1962 3 Sheets-Sheet 1

LEE W. RAMSEY
INVENTOR
HUEBNER & WORREL
ATTORNEYS
BY
Richard M. Worrel

Aug. 22, 1967  L. W. RAMSEY  3,336,736
PLANT COMPRESSING AND GUIDING SYSTEM FOR
MECHANICAL COTTON PICKERS
Filed April 13, 1962  3 Sheets-Sheet 2

LEE W. RAMSEY
INVENTOR
HUEBNER & WORREL
ATTORNEYS
BY
Richard M. Worrel

Aug. 22, 1967
L. W. RAMSEY
3,336,736
PLANT COMPRESSING AND GUIDING SYSTEM FOR
MECHANICAL COTTON PICKERS
Filed April 13, 1962
3 Sheets-Sheet 3
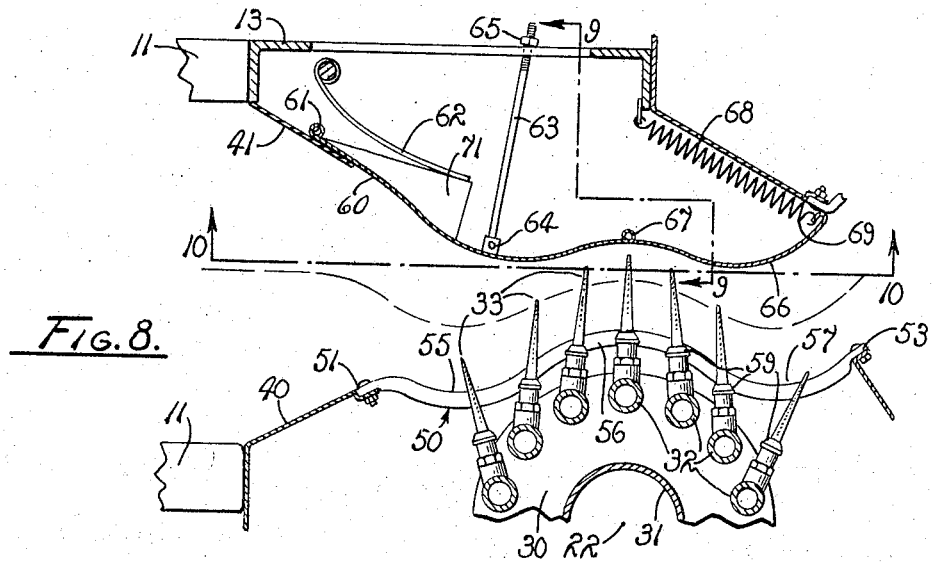
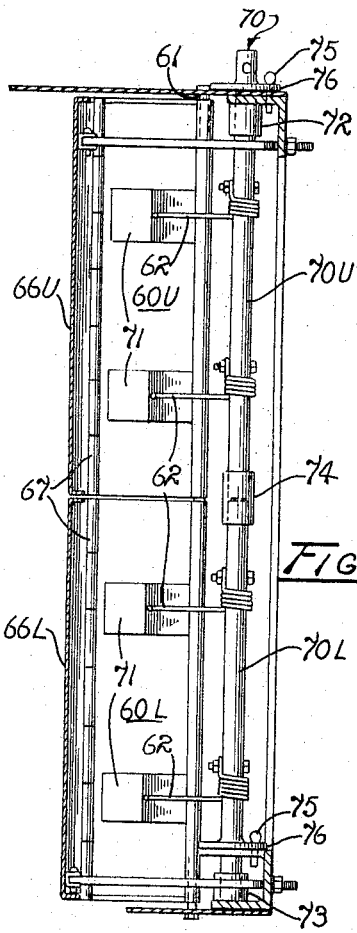
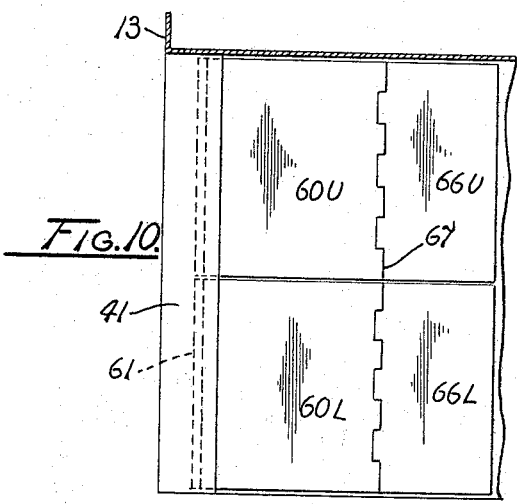
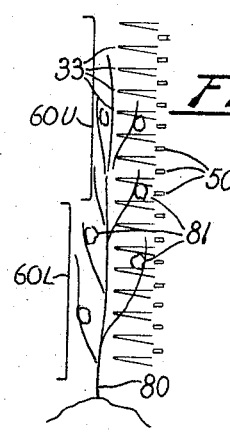
LEE W. RAMSEY
INVENTOR
HUEBNER & WORREL
ATTORNEYS
BY United States Patent Office 3,336,736
Patented Aug. 22, 1967

3,336,736
PLANT COMPRESSING AND GUIDING SYSTEM FOR MECHANICAL COTTON PICKERS
Lee W. Ramsey, Kerman, Calif., assignor of one-half to Howard A. Scott, Fresno, Calif.
Filed Apr. 13, 1962, Ser. No. 187,397
7 Claims. (Cl. 56—47)

This invention relates to mechanical cotton pickers and more particularly to a compressing and guiding system for the cotton plants which pass through the pickers during the picking of the individual bolls from such plants.

Conventional mechanical cotton pickers normally employ two laterally opposed, longitudinally spaced, picking units employing picker carrier drums which are rotated at a peripheral speed correlated in matched relation to the rate of ground traversing movement of the vehicle on which they are supported. Circumferentially spaced about the periphery of the picker drums is a plurality of vertical picker bars which support a multiplicity of vertically spaced picking spindles individually mounted for rotation about their respective axes, the axes being disposed in substantially horizontal planes. During operation of such mechanical cotton pickers, the picker drums are rotated in opposite directions while being transported beside and lengthwise of a row of cotton plants bearing mature cotton bolls. Mechanism is provided to rotate the individual spindles on their axes and cam means are also associated with the carriers so that the spindles are moved successively toward and away from the cotton plants in the row. This minimizes the breaking of the individual plants by the spindles and increases the picking efficiency of the machine.

A guiding and compressing apparatus is normally associated with the rotating carriers and spindles, to provide a path of travel for the cotton plants relative to the picking units as the machine traverses a given row. Conventional guiding apparatus provides a substantially rectilinear path of travel which is tangential with respect to the carrier drum, and accordingly of minimum linear dimensions. The present invention recognizes that this unduly limits the length of the picking zone during which the individual spindles pluck the bolls from the cotton plants.

With such conventional picking and plant guiding apparatus, the individual cotton plants remain in a substantially vertical or normal growing position as they progress through the cotton picking machine. The individual bolls on such a plant must then be plucked by contact with a rotating spindle. Since there are vertical intervals of spacing between the spindles on each picker bar, and the individual bolls on a given cotton plant remain at a constant vertical position as the plant progresses through the machine, a certain number of bolls are necessarily missed during picking. The cotton borne by such bolls represents a loss to the cotton rancher.

Accordingly, it is an object of the present invention to reduce the quantity of cotton lost by conventional mechanical cotton pickers.

Another object is to provide a plant compressing and guiding system for mechanical cotton pickers which enlarges the effective picking zone by providing a tortuous path for the cotton plants passing through a cotton picking machine.

Another object is to extend the period of time in which the bolls are exposed to the picking spindles of a mechanical picker.

Another object is to lengthen the picking zone of a conventional mechanical cotton picker as well as extending the effective vertical range of each individual picking spindle.

Another object is to provide a plant compressing and guiding system which accommodates individual cotton plants which are bilaterally asymmetrical in relation to the direction of travel of the cotton picker.

Another object is to provide a guiding system for cotton pickers which effectively harvests cotton from plants that are of non-uniform radial dimensions at various elevations.

A further object is to provide an improved guiding system for mechanical cotton pickers which is simple in structure, effective and dependable in operation, and readily incorporated into conventional cotton pickers as an attachment therefor.

These, together with other objects, will become more fully apparent upon reference to the following description and accompanying drawings.

In the drawings:

FIG. 8 is a fragmentary view, somewhat enlarged, of one of the picking carriers shown in FIG. 2 associated with a second form of the plant compressing and guiding system of the present invention.

FIG. 9 is a view in vertical transverse section taken from a position indicated by the arrows 9—9 in FIG. 8.

FIG. 10 is a fragmentary view in vertical section taken from a position indicated by the arrows 10—10 in FIG. 8, and on a scale somewhat reduced from FIG. 9.

FIG. 11 is a diagrammatic illustration of the guiding system shown in FIGS. 8, 9 and 10 in operation with a cotton plant of non-uniform configuration.

Figure 1:
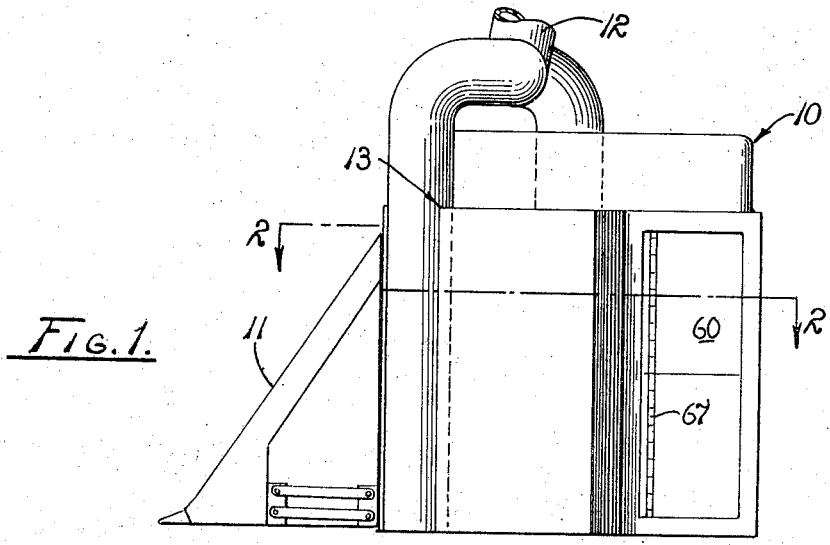
FIG. 1 is a view in side elevation showing a conventional single-row cotton picking unit adapted for mounting on a self-propelled vehicle, such as a conventional agricultural tractor.

Referring to FIG. 1, a conventional cotton picking unit provided with the plant compressing and guiding system of the present invention is illustrated at 10, and is normally adapted for mounting on a self-propelled vehicle, not shown. The picking unit illustrated is of the single-row type, and is provided with a pair of laterally opposed stalk lifters 11, which serve as initial guiding members to lift the lower portions of the cotton plants and to guide them through the picking unit. A portion of a pneumatic conveyor pipe is shown at 12 which leads from the picking unit and transports the individual bolls or clumps of cotton to a receptacle, also not shown. The picking unit is also provided with an enclosing housing 13 in which is supported the component parts of the picking unit and the compressing and guiding system subsequently to be described.

Figure 2:
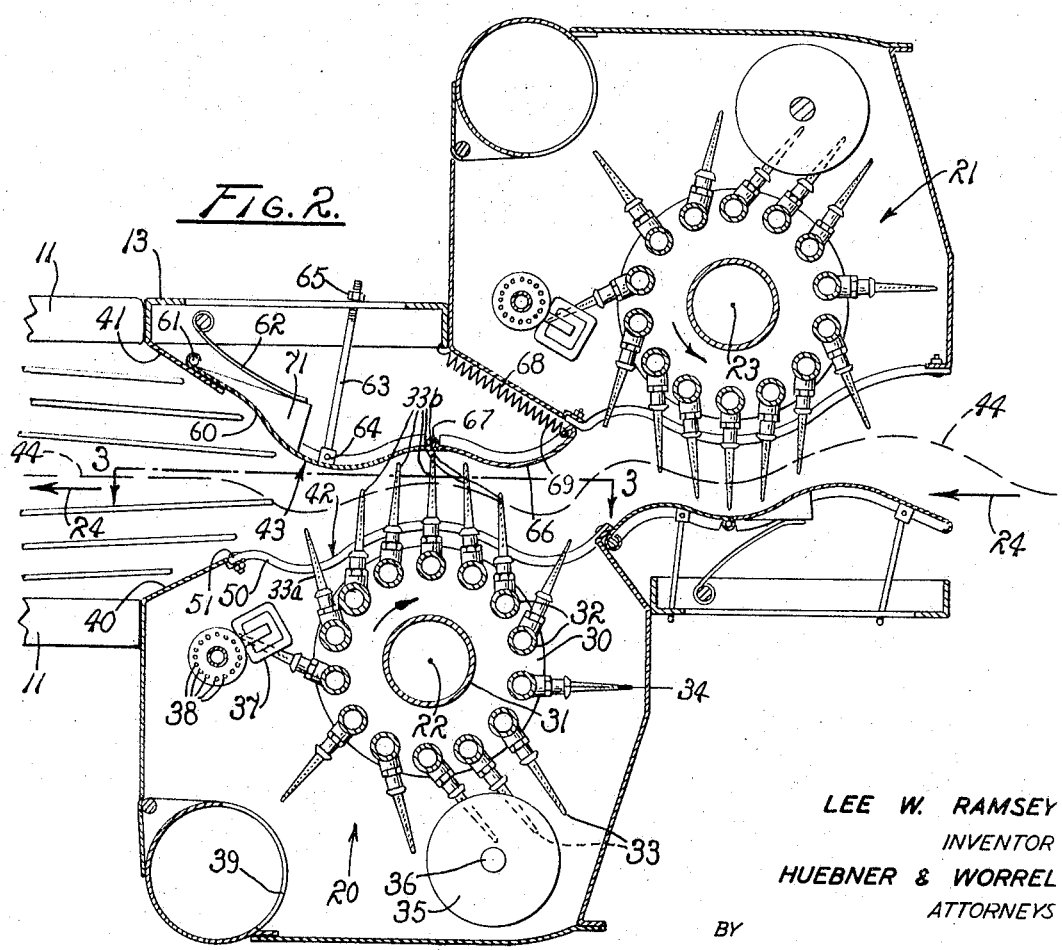
FIG. 2 is a somewhat enlarged fragmentary view in longitudinal transverse section, taken on line 2—2 of FIG. 1.

Referring further to FIG. 2, the picking unit 10 is provided with a pair of laterally opposed, longitudinally spaced picking assemblies 20 and 21 which are mounted for rotation in the unit about individual axes of rotation respectively indicated at 22 and 23. As shown in FIGS. 1 and 2, the picking unit is adapted for movement from right to left along a rectilinear path of travel indicated at 24 which is normally aligned with an elongated row of cotton plants. In conventional machines, the plant compressing and guiding system normally provides a path of travel for each plant relative to the picking unit, and such path of travel is substantially coincident with the path of travel of the machine nidicated at 24.

For an understanding of the compressing and guiding system of the present invention, a brief description will be made of the elements of one of the picking assemblies 20 and 21. Since they are substantially identical, only one will be described. Although some mechanical cotton pickers have only one picking assembly, and the invention may be used to advantage with such pickers, the invention is ideally suited for use with pickers which incorporate a pair of laterally opposed longitudinally spaced picking assemblies, such as those shown at 20 and 21.

Each of the picking assemblies 20 and 21 comprises a carrier 30 which is substantially cylindrical in form. The carrier is powered for rotation about the axis 22 provided by a drive shaft 31. Circumferentially spaced about the periphery of the carrier is a plurality of vertically disposed picker bars 32, each of which supports a plurality of vertically spaced spindles 33. Each of the spindles is mounted in each picker bar for rotation about an individual axis, such as is indicated at 34. For reasons of clarity, the gear train employed for driving the individual spindles as well as the cam means and cam followers used to constrain the spindles to an oval path about the axis 22 is not shown. Typical means to accomplish these objects are shown in United States Patent No. 1,161,611 to B. C. Calderwood and also United States Patent No. 1,896,694 to H. N. Berry. It is important only to note that the axis of rotation 34 of the individual spindles 33 is substantially normal to the path of travel 24 of the machine during a predetermined portion of the oval path about the axis of rotation of the carrier 30.

Associated with the spindles supported on the carrier is a doffer, indicated at 35, whose function it is to remove the cotton from the spindles after it is plucked from the plants. The doffer is mounted in the housing 13 for rotation by means of a shaft, indicated at 36. Also associated with the spindles is a plurality of vertically spaced moistening pads, one of which is shown at 37 and connected to one of a plurality of water supply conduits 38. A cotton intake tube 39 is provided as part of the pneumatic conveyor system and transports the cotton from the housing 13 after it is removed from the spindles by the doffer 35.

At the forward portion of the housing 13 and rearwardly adjacent to the stalk lifters 11 is mounted a pair of laterally opposed rearwardly converging guide plates 40 and 41 which define an entry throat for the compressing and guiding system. Rearwardly of the guide plates, a pair of laterally opposed walls 42 and 43 is mounted in the housing. The wall 42 is fixed in relation to the carrier 30, whereas the wall 43 is resiliently biased toward the carrier. Each of the walls is of complementary waveform to define a tortuous path 44 therebetween. As the cotton picking unit 10 is motivated along a path of travel 24, the individual cotton plants in a row are constrained to the path of travel 44 relative to the picking unit.

It will be noted that the path of travel 44 of the cotton plants is defined by the opposed walls 42 and 43 and makes substantial lateral departures from the path of travel 24, which will angularly deflect the cotton plants laterally during ground traversing movement of the vehicle.

Figure 3:
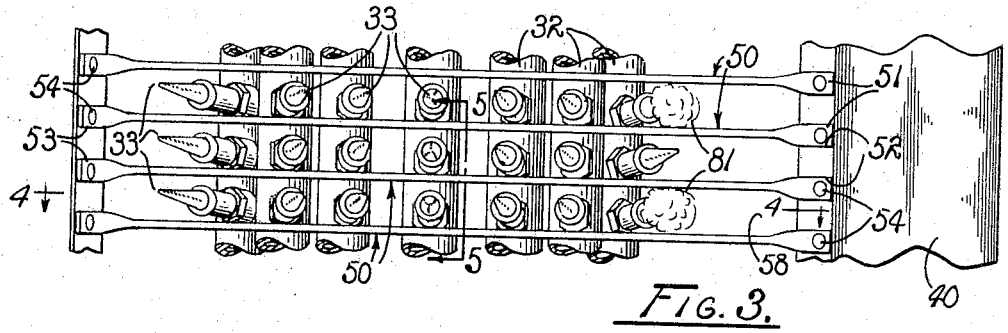
FIG. 3 is a somewhat enlarged, fragmentary view of the picking apparauts and a portion of the guiding system of the picking unit, taken from a position indicated by the arrows 3—3 of FIG. 2.
Figure 4:
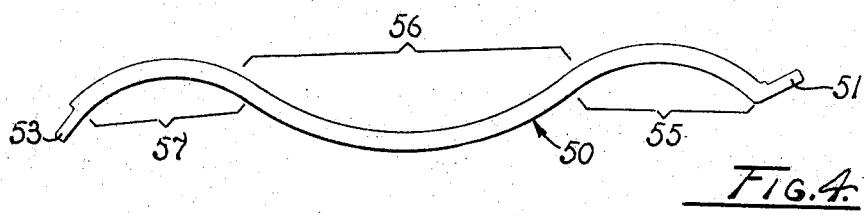
FIG. 4 is a top plan view of one of the guide bars shown in FIG. 3 taken from a poistion indicated by the arrows 4—4.
Figure 5:
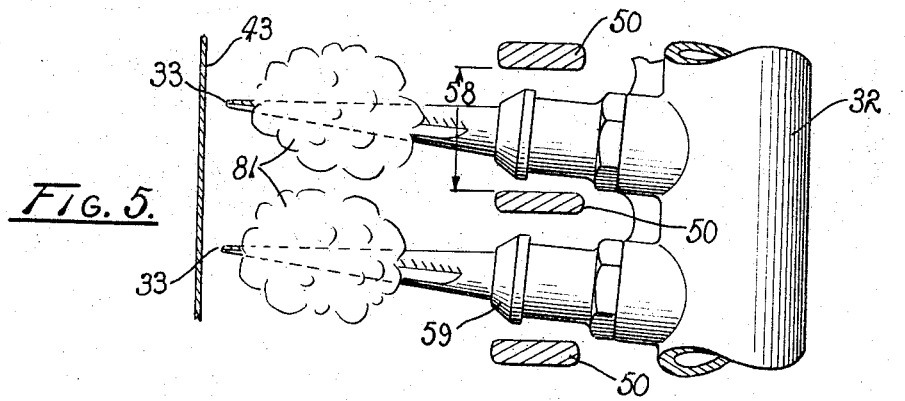
FIG. 5 is a fragmentary, somewhat enlarged view in vertical transverse section, taken on line 5—5 of FIG. 3.

As shown in FIG. 3, the fixed wall 42 comprises a plurality of vertically spaced individual grid bars 50. Each of the grid bars has an end 51 received in a socket 52 provided in the housing 13. An opposite end 53 is secured to the housing by means of a capscrew 54. As can be seen more clearly in FIG. 4, each of the grid bars is provided with an initial guiding portion 55, a curvilinear picking zone portion 56 of a curvature reversed from that of the portion 55 and a spindle withdrawal portion 57. The bars are mounted in the housing to provide uniform vertical intervals of spacing 58 into which the picking spindles 33 are periodically projected as the carrier 30 is rotated. It is to be noted that the vertical thickness of the individual bars is reduced throughout the picking zone and spindle withdrawal portion to permit projection of the spindles 33 to their maximum length throughout the picking zone and to provide a withdrawal space to accommodate a spindle heavily laden with cotton. Also, the picking zone portion of the grid bars 50 is formed of a radius conforming to that of the carrier 30 so that the picking zone is lengthened. This permits a greater number of peripherally spaced spindles to operate in the picking zone at a given time. As shown in FIG. 3, the intervals of spacing at the withdrawal portion of the fixed wall are of sufficient width to accommodate a spindle loaded with cotton to the spindle nut shield 59 at the base of each spindle.

The resiliently biased wall 43 constitutes a pressure plate adapted to compress the cotton plants against the fixed wall 42 and to guide the plants through the path of travel 44 defined by the walls. The details of the wall 43 are shown in FIGS. 2 and 8–10. In the form of pressure plate illustrated in FIG. 2, the wall 43 is not divided on a horizontal line intermediate the upper and lower ends. However, in the second form shown in FIGS. 8, 9 and 10, the wall 43 is divided into separate upper and lower portions. Since both portions are identical, yet are free to move as individually biased structures, only one of them will be described in detail in conjunction with the form illustrated in FIG. 2.

The wall 43 comprises an entry portion 60 pivotally mounted for movement about a vertically disposed hinge 61 secured to the housing 13. A spring 62 also supported in the housing provides a force to bias the wall 43 toward the fixed wall 42. A rod 63 pivotally secured to the entry portion by a mounting pin 64 is adjustable by means of a nut 65 to vary the effective length of the rod and to limit movement of the wall 43 toward the carrier. A rear portion 66 is pivotally secured to the front portion 60 by means of a vertically disposed hinge 67. A spring 68 secured to the terminal end 69 of the rear portion 66 and the housing 13 maintains the end 69 in contact with a portion of the housing. The resilient mounting afforded by the spring 68 permits pivotal movement about the end 69 as well as minor changes in its longitudinal position relative to the housing as the entry portion 60 pivots about the hinge 61. It is to be noted that the rear portion 66 provides a continuation of the wave-form path of travel indicated at 44; however, the lateral dimensions of this path increases in this spindle withdrawal portion to permit the cotton plants to expand laterally as the spindle is withdrawn from the plant.

As can be seen in FIGS. 8, 9 and 10, the second form of resiliently biased wall comprises entry portions and rear portions 60 and 66, each having separate upper and lower portions respectively designated by the suffixes U and L. The entire wall is divided longitudinally along a horizontal plane and the upper and lower portions are individually mounted for respective relative movement. This is more clearly illustrated in FIG. 11.

As shown in FIG. 9, the springs 62 are anchored on a shaft 70 having upper and lower portions 70U and 70L. The springs bear against shoes 71 secured to the entry portion 60. The shaft 70 is rotatably mounted in the housing 13 by vertically spaced bearings 72 and 73 and a coupling member 74 permits independent rotation of the portions 70U and 70L. By rotating these portions of the shaft 70 in a clockwise direction as viewed in FIGS. 2 and 8, the force exerted by the springs 62 may be increased or decreased, as desired. The shaft 70 may be maintained in a selected position to pre-load the springs at a desired force by means of setscrews indicated at 75 carried in collars 76 respectively secured to the shaft portions 70U and 70L or by any other suitable means.

Operation

The operation of the described embodiments of the subject invention is believed to be readily apparent and is briefly summarized at this point. The picking unit 10 being carried on a self-propelled vehicle (not shown) traverses a row of cotton plants along a path of travel indicated at 24, in FIG. 2. During such travel, the plant lifters 11 lift the lower branches of individual plants and guide them toward the entry throat defined by the convergent guide plates 40 and 41. Progressive ground traversing movement of the picking unit causes relative movement between the individual plants and the plant compressing and guiding system of the present invention, generally constituted by the opposed walls 42 and 43. The entry or initial guiding portion of both of the walls, indicated at 55 and 60, respectively, effects further lateral compression of the plants and guides the plants in a path of travel indicated at 44. The path 44 conforms to the periphery of the cylindrical carrier 30 and in so doing makes a lateral departure from the rectilinear path of travel indicated at 24. The results of such initial guiding is to dispose each cotton plant bearing mature cotton bolls in a position with respect to the spindles entering the picking zone so that the spindles may contact the bolls at an earlier point in the path of travel of the plants through the machine. This materially lengthens the picking zone of the unit 10.

Figure 6:
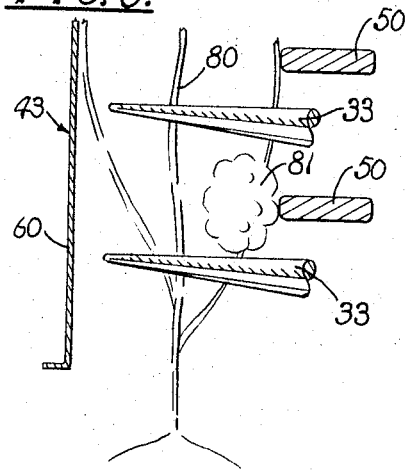
FIG. 6 is similar to FIG. 5 and shows a cotton plant in one position during movement through the machine.
Figure 7:
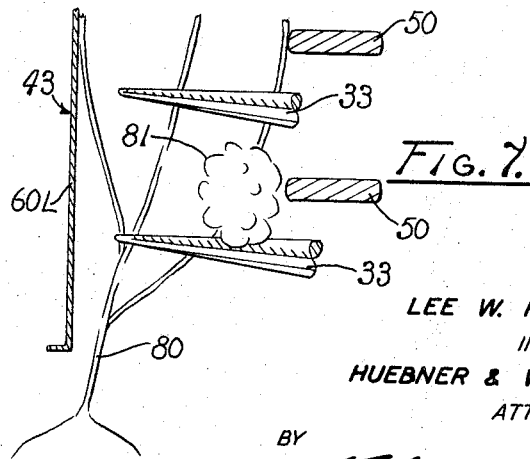
FIG. 7 is similar to FIG. 6 but shows the same cotton plant in another position during movement through the machine.

In addition to increasing the length of the picking zone, the upper portion of each of the plants is deflected laterally from its normal upright growing position, which results in changes in the normal elevation of the bolls. This is illustrated in FIGS. 6 and 7. In FIG. 6 a cotton plant 80 is shown in a normally upright position bearing a mature cotton boll 81 which is disposed intermediate the vertically spaced spindles 33. The relative dimensions of average cotton bolls and the vertical spacing of these spindles is such that a certain percentage of cotton bolls are not effectively grasped by the spindles as the plants pass through the picking unit. With the guiding system of the present invention, the deflection of the cotton plant caused by the lateral departure of the path of travel 44 of the plants in relation to the rectilinear path of travel 24 of the picking unit, effects a change in the elevation of the bolls borne by the cotton plant. This change in elevation may be computed as a function of the cosine of the angle of deflection.

In actual practice, the guiding system is effective to deflect an average cotton plant of twenty-five to thirty inches in height through an angle of fifteen to twenty degrees which results in a change in elevation of approximately an inch and one-half for bolls borne by the uppermost portion of the cotton plant and a change of one-half to three-fourths of an inch for bolls borne by the midportion of the plant. The curvilinear converging path of travel defined by the entry portion of the opposed walls need deflect the cotton plants angularly only a distance sufficient to result in a change in elevation of the bolls so that a spindle operating in a plane below the normal position of the boll is contacted by the boll and plucked from the cotton plant. This angular deflection of the cotton plant and change in elevation of the boll is illustrated in FIG. 7 wherein the lower spindle is contacted by the boll whereas in the normal upright position of the plant, shown in FIG. 6, this same boll would have escaped contact by any of the spindles.

As the picking unit 10 further progresses along a given row of plants, the plants are compressed to a maximum during a curvilinear path of travel through a picking zone defined by the portion 56 of the grid bars 50 and the spring-biased wall 43 of complementary form. Both the wall 43 and the portion 56 of the grid bars are shaped in conformance to the periphery of the cylindrical carrier 30. By thus defining the path of travel for the cotton plants in conformity to the cylindrical periphery of the carrier 30, a greater number of picking spindles are permitted to operate within the picking zone at a given time. In FIGS. 2 and 8, it can be seen that one spindle 33a is entering the zone, while five picking spindles, indicated at 33b are operating within the picking zone substantially throughout the effective length of all of the spindles. With conventional machines utilizing guide plates which define a substantially rectilinear path coinciding with the rectilinear path of travel of the picking unit, a maximum of three picking spindles operate within the picking zone at a given time, and the length of the picking zone is necessarily limited to a range less than the extended picking zone afforded by the present invention. Because of this, it is well-known in conventional mechanical cotton pickers that most of the cotton is picked by the outermost two or three barbs, they being all that remain in the cotton plants for a period sufficient to be effective. Aided by the device of the present invention, the spindles are effective throughout virtually their entire lengths and their picking efficiency is multiplied.

Further movement of the picking unit 10 along a given row effects relative movement of the plants through the machine and they are guided along a relative path of travel rearwardly of the picking zone into a spindle withdrawal zone defined by the complementary but divergent walls formed by the portions 57 of the grid bars 50 and the rear portion 66 of the resiliently biased wall 43. These diverging walls permit the compressed cotton plants to expand laterally prior to the withdrawal of the spindles from the plant. This permits the branches of the main stalk of the cotton plant to move away from each other to afford larger openings through which the picking spindles can be withdrawn. With conventional compressing and guiding systems, the plants remain in a compressed state during withdrawal of the picking spindles which results in a portion of the cotton picked by the spindles being doffed therefrom and lost in the field.

With the picking apparatus disclosed utilizing a pair of laterally opposed longitudinally spaced picking assemblies, the travel of the plants through the second picking assembly is substantially identical to that described above in connection with the picking assembly 20. Accordingly, it can be seen that the plant compressing and guiding system defines a tortuous wave-form path of travel for the cotton plants through the machine, lengthens the extent of the picking zone and increases the effective vertical range of the picking spindles by laterally deflecting the individual cotton plants. The invention thus reduces the number of bolls which are only partially picked which normally result in "flags" or "tags" left by pickers using a conventional guiding system. In addition, the system permits expansion of the compressed cotton plants to withdrawal of the loaded spindles which reduces the quantity of picked cotton subsequently stripped from the spindles and lost in the field. Accordingly, a plant compressing and guiding system has been provided which can be readily incorporated into conventional cotton pickers as an attachment and materially improve their efficiency.

The modified form of the invention shown in FIGS. 8, 9, 10 and 11 includes the structural features discussed above as well as the advantages resulting therefrom. In addition, since the resiliently biased wall 43 is divided along a horizontal plane into respective upper and lower portions, the wall can thus accommodate cotton plants which are not radially symmetrical throughout the length of the stalk. This is illustrated in FIG. 11 and assures effective plant conformance whether the plants have large tops and small lower portions or large lower portions and small tops. In operation, the upper and lower walls independently function substantially identically to that described above and in addition have the capability of accommodating such non-symmetrical cotton plants.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a mobile cotton picker having at least one cotton picker spindle carrier of cylindrical form, rotatable about a vertical axis and provided with a plurality of picker spindles mounted in the carrier for rotation about substantially horizontal respective individual axes, means to rotate the carrier at a peripheral speed substantially equal to the rate of ground traversing movement of the picker along a path of travel coincident with a selected row of cotton plants bearing mature cotton bolls, and means associated with the carrier to effect substantially rectilinear movement of the individual spindles toward and away from the cotton plants in said row during a pre-selected portion of the path about said vertical axis; a plant compressing and guiding system comprising a pair of laterally opposed spaced walls of complementary undulating form defining therebetween a path of travel for the plants through the picker, the path being of a wave-form with at least one reversed curve portion and a portion which laterally departs from said selected row, one of said walls being pivotally mounted in the picker about a vertical axis and resiliently biased toward the other wall.

2. In a mobile cotton picker, the plant compressing and guiding system of claim 1 wherein said resiliently biased wall includes at least two separate portions divided along a horizontal plane intermediate the upper and lower edges of said wall, and has separate biasing means mounted in the picker and independently engaging said portions.

3. The plant compressing and guiding system of claim 1 wherein said resiliently biased wall comprises an entry portion pivotally mounted in the picker about a vertical axis, an opposite discharge portion having one end resiliently mounted in the picker, a hinge interconnecting said portions and providing a pivotal axis substantially parallel to said vertical axis; and stop means mounted in the pickup and operatively connected to said entry portion to limit the movement of the entry portion toward the spindle carrier.

4. The plant compressing and guiding system of claim 1 wherein said walls define a tapering enrty throat located forwardly of the vertical carrier axis; a constricted picking zone of curvilinear form and substantially conforming to the periphery of the carrier; and a spindle withdrawal zone rearwardly of said picking zone and of a lateral dimension greater than said picking zone whereby the plants compressed in the picking zone are permitted to expand laterally prior to the withdrawal of the individual spindles.

5. In a mechanical harvester adapted to traverse an elongated substantially straight row of plants and having a substantially cylindrical picking mechanism rotatable about a substantially concentric axis, a wall extended longitudinally of the harvester providing an arcuate portion curved about a portion of the periphery of the picking mechanism, an initial guiding portion, and a spindle withdrawal portion, the latter portions both being arcuately reversely curved from the first said portion, said wall being slotted to permit operation of the picking mechanism therethrough, and a compression wall of a configuration substantially complementary to the slotted wall mounted in the harvester in spaced juxtaposition to the slotted wall and therewith defining a plant passage past the picking mechanism in arcuate conformance to a peripheral portion thereof, said plant passage departing from said straight row.

6. In a mechanical harvester having a predetermined direction of earth traversing movement, a substantially cylindrical carrier mounted for rotation about a substantially erect concentric axis, and spindles mounted on the carrier and outwardly extended therefrom, the combination of a substantially erect wall mounted in the harvester and extended longitudinally of the direction of harvester movement having a substantially horizontally slotted portion extended arcuately substantially concentrically about approximately ninety degrees of the carrier, the slots being disposed to receive the spindles in projection therethrough and retraction therefrom during carrier rotation, and a substantially erect compression wall mounted in the harvester and extended longitudinally of the direction of harvester movement in spaced relation to the slotted wall and therewith defining a plant passage having an intake throat, a picking zone and an outlet, said compression wall rearwardly converging with the slotted wall in the intake throat to compress plants in the passage, being arcuately concentric to the slotted wall in the picking zone to hold the plants for operation of the spindles therein, and rearwardly diverging from the slotted wall at the outlet to facilitate retraction of the spindles from the plants.

7. In a mechanical harvester having a predetermined direction of earth traversing movement, a substantially cylindrical carrier mounted for rotation about a substantially erect concentric axis, and spindles mounted on the carrier and outwardly extended therefrom, the combination of a substantially erect wall mounted in the harvester and extended longitudinally of the direction of harvester movement, said wall having a substantially horizontally slotted portion extended arcuately substantially concentrically about said axis of the carrier through an angle sufficient to encompass entirely at least one spindle, the slots being disposed to receive the spindles in projection therethrough and retraction therefrom during carrier rotation, and a substantially erect compression wall mounted in the harvester and extended longitudinally of the direction of harvester movement in spaced relation to the slotted wall and therewith defining a plant passage having an intake throat, a picking zone and an outlet, said compression wall rearwardly converging with the slotted wall in the intake throat to compress plants in the passage, being arcuately concentric to the slotted wall in the picking zone to hold the plants for operation of the spindles therein, and rearwardly diverging from the slotted wall at the outlet to facilitate retraction of the spindles from the plants.

References Cited

UNITED STATES PATENTS

| | | | |
|---|---|---|---|
| 2,333,965 | 11/1943 | Weems | 56—44 |
| 2,576,567 | 11/1951 | Brown | 56—44 |
| 2,665,536 | 1/1954 | Rust | 56—42 |
| 2,676,449 | 4/1954 | Smith | 56—41 |
| 3,039,258 | 6/1962 | Cafaro | 56—49 |
| 3,103,092 | 9/1963 | Templeton | 56—44 |

ABRAHAM G. STONE, *Primary Examiner.*

T. GRAHAM CRAVER, RUSSELL R. KINSEY,
*Examiners.*

M. C. PAYDEN, *Assistant Examiner.*